(12) United States Patent
Yamada et al.

(10) Patent No.: US 6,664,700 B2
(45) Date of Patent: Dec. 16, 2003

(54) BRUSH HOLDING DEVICE CAPABLE OF REDUCING NOISE

(75) Inventors: Takahiro Yamada, Toyohashi (JP); Hisashi Masui, Kosai (JP); Noriyuki Suzuki, Kosai (JP); Takashi Saito, Toyohashi (JP); Mitsuo Odagiri, Kosai (JP); Toshiyasu Ishizuka, Hamamatsu (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/940,719

(22) Filed: Aug. 29, 2001

(65) Prior Publication Data

US 2002/0047472 A1 Apr. 25, 2002

(30) Foreign Application Priority Data

Sep. 5, 2000 (JP) ........................................ 2000-268959

(51) Int. Cl.$^7$ ................................................ H01R 39/38
(52) U.S. Cl. .................... 310/239; 310/71; 310/249
(58) Field of Search .................................. 310/239–251, 310/71

(56) References Cited

U.S. PATENT DOCUMENTS

| 4,963,779 A | * | 10/1990 | Lentino et al. ............... 310/71 |
| 5,648,695 A | * | 7/1997 | Yamaguchi et al. ........ 310/242 |
| 5,939,812 A | | 8/1999 | Wetzel |

FOREIGN PATENT DOCUMENTS

| DE | 42 41 405 A1 | 6/1994 |
| GB | 2 118 784 A | 11/1983 |
| JP | A-9-261914 | 10/1997 |
| JP | A-10-304625 | 11/1998 |

* cited by examiner

*Primary Examiner*—Thanh Lam
(74) *Attorney, Agent, or Firm*—Posz & Bethards, PLC

(57) ABSTRACT

A brush holding device includes a dielectric resin circuit board and at least one metal brush holder secured to the circuit board at its base portion. Each brush holder includes a receiving recess that receives a brush and a spring for urging the brush against a commutator. A side wall of the brush holder located at a radially outer side of the brush holder includes an engaging piece that resiliently engages against an inner peripheral surface of an outer peripheral wall of the circuit board.

26 Claims, 9 Drawing Sheets

BRUSH HOLDING DEVICE CAPABLE OF REDUCING NOISE

CROSS REFERENCE TO RELATED APPLICATION

This application is based on and incorporates herein by reference Japanese Patent Application No. 2000-268959 filed on Sep. 5, 2000.

BACKGROUND OF THE INVENTION

1. Field of the Invention

The present invention relates to a brush holding device arranged in a direct current motor.

2. Description of Related Art

A direct current motor includes a commutator and brushes to mechanically commutate direct current supplied from an external direct current source and to supply it to the armature. The brushes are held in a brush holding device in such a manner that the brushes slidably engage against the commutator.

A previously proposed exemplary brush holding device 50 is shown in FIGS. 13 to 15. The brush holding device 50 includes a circuit board 51 and brush holders 52 (only one is shown). The circuit board 51 is secured to a motor housing (not shown). Each brush holder 52 is made of a heat-resistant metal material, such as a brass material, that exhibits thermally induced small dimensional change. Furthermore, each brush holder 52 is a hollow casing with a generally rectangular cross-section. A radially inner side (located on commutator 53 side) of the brush holder 52 is open, and a radially outer side (located on side opposite the commutator 53) of the brush holder 52 is closed.

Each brush holder 52 is secured to the circuit board 51 at its base portion 52a. A receiving recess 52b is formed in the brush holder 52 and has the open end on the commutator 53 side. A brush 54 and a spring 55 for urging the brush 54 against the commutator 53 are received within the receiving recess 52b of each brush holder 52.

When the commutator 53 rotates, each brush 54 exhibits self-excited vibrations. The self excited vibrations of the brush 54 is induced by fluctuating frictional force between the brush 54 and the commutator 53 and also by collisions between the brush 54 and a respective step formed between each two adjacent segments of the commutator 53. Because of the self-excited vibrations of the brush 54, the brush 54 repeatedly hits the corresponding brush holder 52, causing resonance of the brush holder 52 and generation of noises.

A first possible solution to the above-described disadvantage is to make each brush 54 from a relatively soft material. In this way, a collision force between the brush 54 and the respective step formed between each two adjacent segments of the commutator 53 is reduced, so that the self-excited vibrations of the brush 54 are accordingly reduced.

A second possible solution to the above-described disadvantage is disclosed in Japanese Unexamined Patent Publication No. 10-304625. According to this publication, a notch is formed in a lateral surface of each brush, and a vibration-isolating plate connected to a pig-tail is inserted within and is secured to the notch of the brush. Furthermore, a vibration absorbing material is placed between the vibration-isolating plate and a circuit board. With this arrangement, the self-excited vibrations of the brush are attenuated by the vibration-isolating plate and the vibration absorbing material.

However, in the first solution, there is a disadvantage of accelerated wearing of each brush, resulting in a reduced lifetime of the brush.

In the second solution, the vibration-isolating plate and the vibration absorbing material need to be used, disadvantageously increasing the number of components and the cost.

Furthermore, during rotation of the commutator 53 at a low rotational speed, the brushes 54 and the commutator 53 are placed under a high-friction state that is close to a static friction state. Thus, the self-excited vibrations of the brushes 54 are increased, resulting in generation of relatively large noises.

FIG. 16A shows levels of noises measured for the brush holder 52, and FIG. 16B shows frequency analysis for these noises. During these measurements, the commutator 53 is rotated at a relatively low rotational speed of 15 [rpm].

As indicated by an arrow B in FIG. 16A, it will be understood that the use of the previously proposed brush holders 52 causes relatively large levels of noises. Furthermore, as indicated by an arrow C in FIG. 16B, it will be understood that particularly large noises are observed in a range of 6 to 7 [kHz]. Thus, reduction of the noises at the above low rotational speed of the commutator 53 has been demanded.

SUMMARY OF THE INVENTION

The present invention addresses the above disadvantages. Thus, it is an objective of the present invention to provide a brush holding device that can reduce noises without changing a material of brushes and without increasing the number of components.

To address the above disadvantages, there is provided a brush holding device including a dielectric resin circuit board and at least one metal brush holder secured to the circuit board at its base portion. The circuit board is secured to a motor housing. Each brush holder includes a receiving recess that receives a brush and a spring for urging the brush against a commutator. One of each brush holder and the circuit board or the housing has at least one engaging portion integrally formed therein for achieving resilient engagement between each brush holder and the circuit board or the housing.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
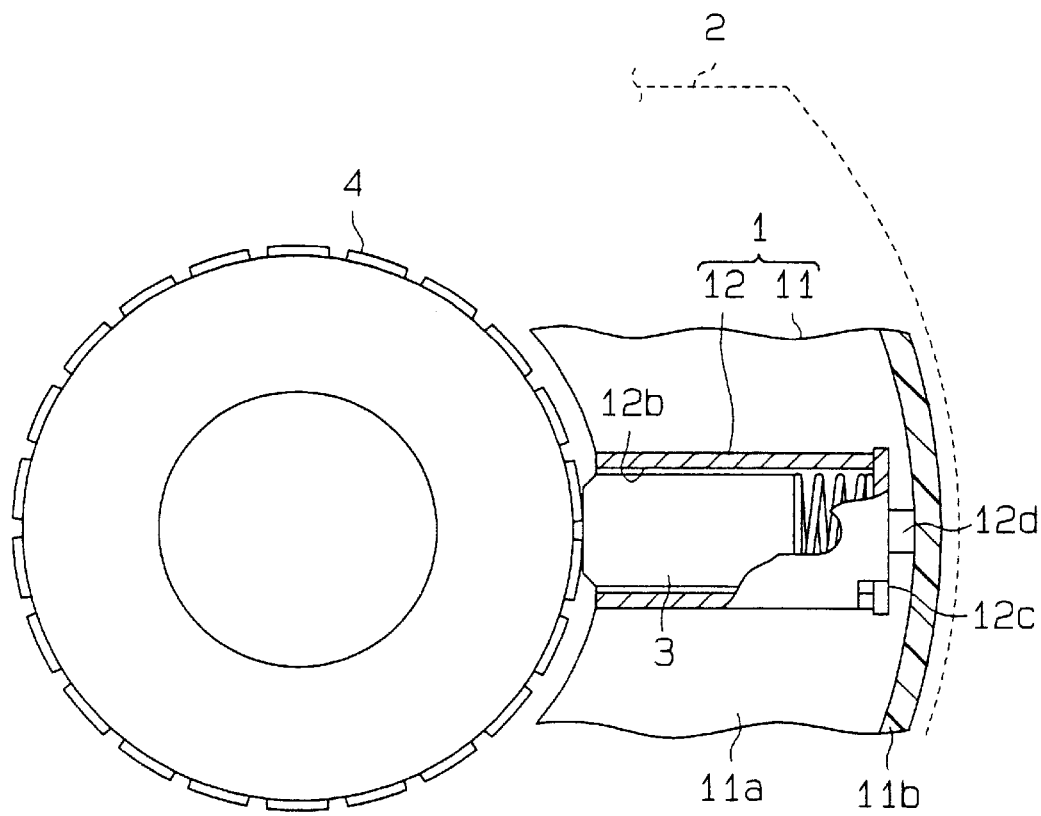
FIG. 1 is a partial plan cross-sectional view of a brush holding device according to an embodiment of the present invention.
Figure 2:
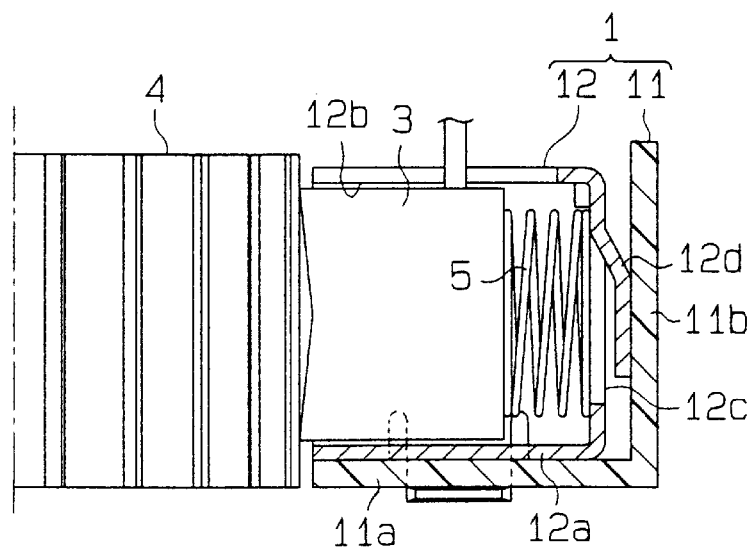
FIG. 2 is a partial side cross-sectional view of the brush holding device according to the embodiment.
Figure 3:
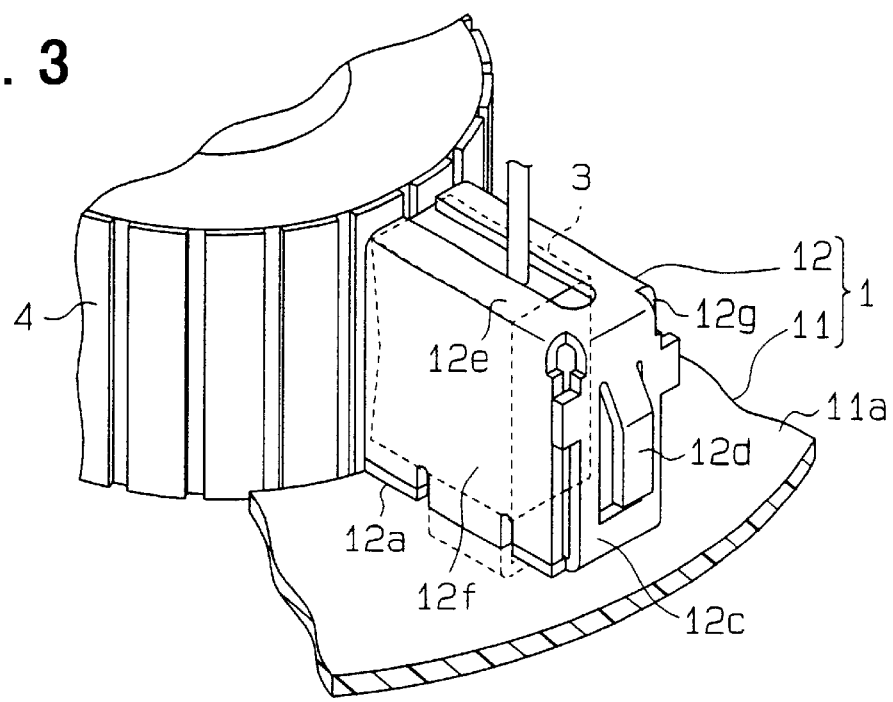
FIG. 3 is a partial perspective view of the brush holding device according to the embodiment.

FIGS. 1 to 3 show a brush holding device 1 according to the present embodiment. The brush holding device 1 is installed within a motor housing 2 of a direct current motor. The direct current motor includes brushes 3 and a commutator 4 to mechanically commutate direct current supplied from an external direct current source and to apply it to an armature (not shown). The brushes 3 are arranged to be held by the brush holding device 1 and to slidably engage against the commutator 4.

The brush holding device 1 includes a circuit board 11 and brush holders 12 (only one is shown in the accompanying drawings).

The circuit board 11 is made of a dielectric resin material and is secured to the motor housing 2. The circuit board 11 includes a flat portion 11a and an outer peripheral wall 11b. The flat portion 11a extends in a direction perpendicular to an axial direction of the commutator 4. The outer peripheral wall 11b extends from an outer peripheral edge of the flat portion 11a on the brush holder 12 side in the axial direction.

Each brush holder 12 is made of a heat-resistant metal material, such as a brass material, that exhibits thermally induced small dimensional change. Furthermore, each brush holder 12 is a hollow casing with a generally rectangular cross-section. A radially inner side (located on the commutator 4 side) of the brush holder 12 is open, and a radially outer side (located on the side opposite the commutator 4) of the brush holder 12 is closed. This brush holder 12 is manufactured by die-cutting one plate material by press work and bending it to a predetermined shape. A base portion 12a of the brush holder 12 is secured to the flat portion 11a of the circuit board 11. A receiving recess 12b is formed in the brush holder 12 and has the open end on the commutator 4 side thereof. A brush 3 and a spring 5 for urging the brush 3 against the commutator 4 are received within the receiving recess 12b.

A rectangular engaging piece 12d is provided in a side wall 12c located at the radially outer side of the brush holder 12 (located on the rear end side of the brush 3). The engaging piece 12d is manufactured by cutting and bending a portion of the side wall 12c such that the engaging piece 12d extends downwardly and radially outwardly from a center of a top end part of the side wall 12c. The engaging piece 12d exerts resilient force, and a distal end (lower end) of the engaging piece 12d resiliently engages against an inner surface of the outer peripheral wall 11b of the circuit board 11.

As described above, when the commutator 4 rotates, each brush 3 exhibits self-excited vibrations that causes generation of noises. The self excited vibrations of the brush 3 is induced by fluctuating frictional force between the brush 3 and the commutator 4 and also by collisions between the brush 3 and a respective step formed between each two adjacent segments of the commutator 4. Particularly at a low rotational speed, the brushes 3 and the commutator 4 are placed under a high-friction state that is close to a static friction state. Thus, the self-excited vibrations of the brushes 3 are relatively large, resulting in generation of relatively large noises.

Figure 4A:
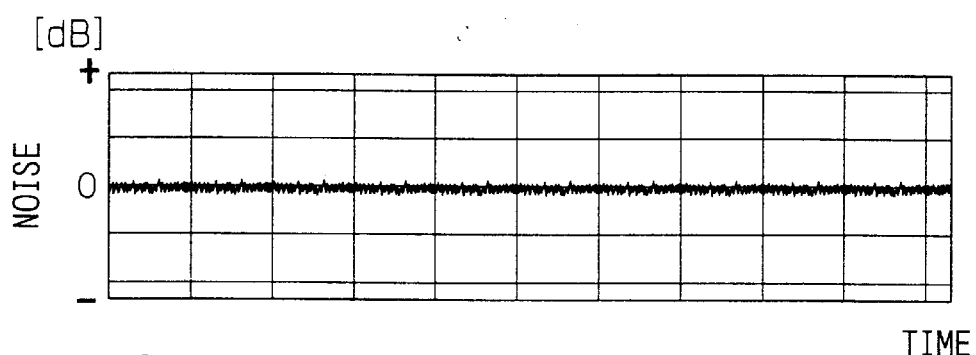
FIG. 4A is a graph showing levels of noises measured for the brush holding device according to the present embodiment.
Figure 4B:
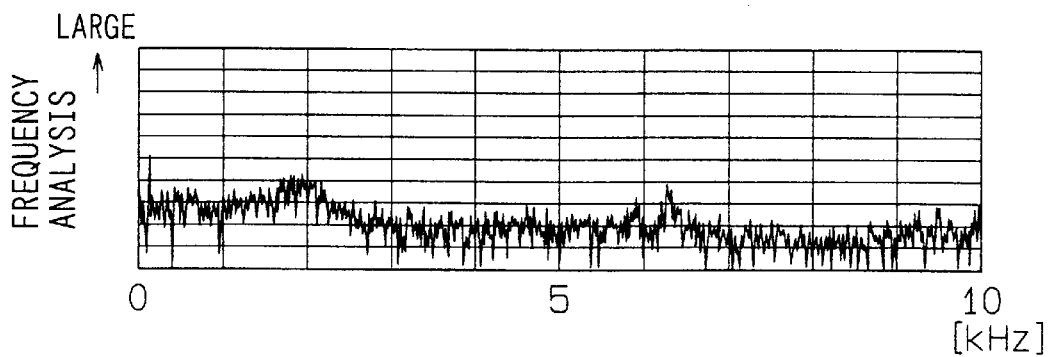
FIG. 4B is a graph showing frequency analysis for the noises measured for the brush holding device according to the present embodiment.

FIG. 4A shows levels of noises measured for the brush holder 12 having the engaging piece 12d according to the present embodiment, and FIG. 4B shows frequency analysis for these noises. The brush holder 12 according to the present embodiment has substantially the same shape as the above-described previously proposed brush holder 52 except the side wall 12c that has the engaging piece 12d. Similar to the measurements of the previously proposed brush holder 52, in this embodiment, the commutator 4 is rotated at a low rotational speed of 15 [rpm]. Furthermore, the brushes 3, the commutator 4 and the circuit board 11 are the same as those previously proposed corresponding ones.

Figure 16A:
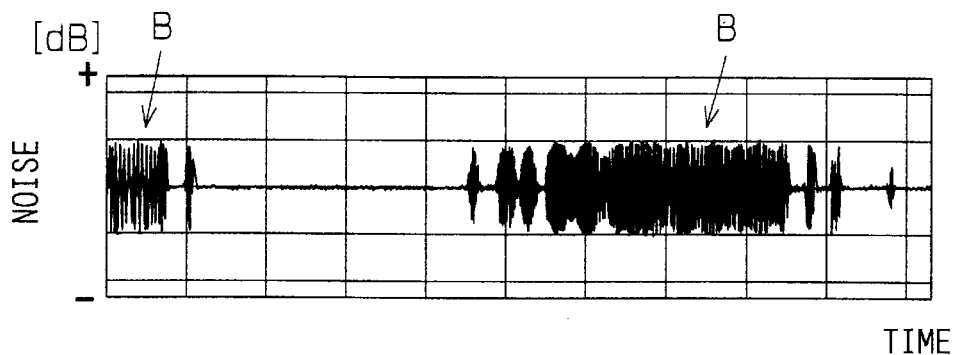
FIG. 16A is a graph showing levels of noises measured for the previously proposed brush holding device.
Figure 16B:
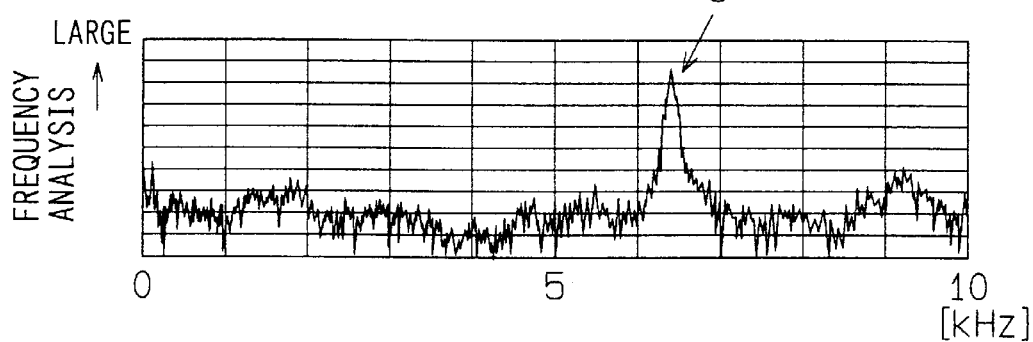
FIG. 16B is a graph showing frequency analysis for the noises measured for the previously proposed brush holding device.

As shown in FIG. 4A, in the case of using the brush holder 12 of the present embodiment, it will be seen that levels of the noises are relatively small in comparison to those of the previously proposed brush holder 52 shown in FIG. 16A. As shown in FIG. 4B, it will be understood that the level of the noises in a range of 6 to 7 [kHz] are particularly effectively restrained in comparison to those shown in FIG. 16B. Thus, in the present embodiment, the vibrations (resonance) of the brush holder 12 are attenuated by the engaging piece 12d, resulting in reduced noise.

Figure 17A:
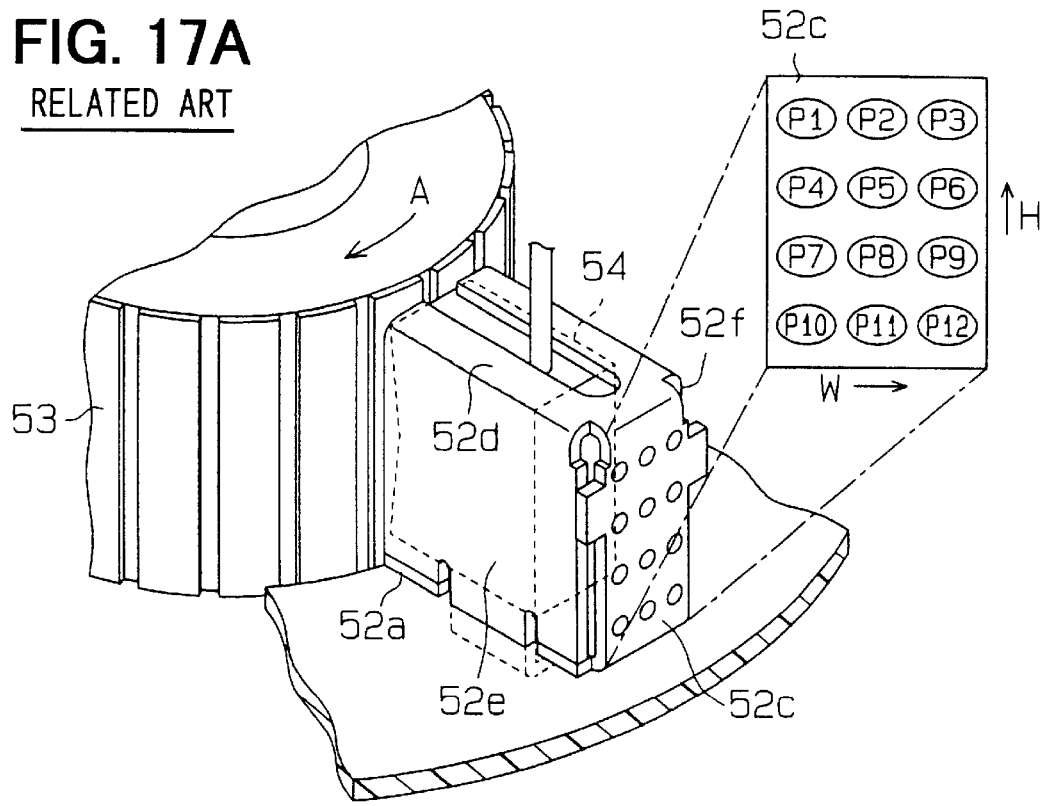
FIG. 17A is a schematic partial perspective view showing various measurement points for measuring vibrations of the previously proposed brush holding device.
Figure 17B:
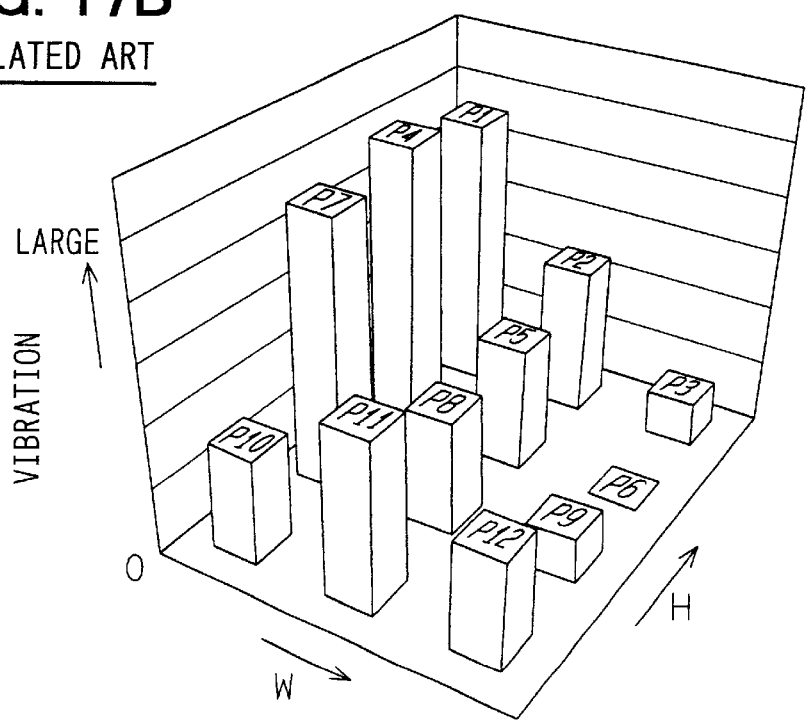
FIG. 17B is a graph showing results of the measurements conducted in the various points shown in FIG. 17A.

Furthermore, with reference to FIGS. 17A and 17B, vibrations are measured at various points on the side wall 52c located at the radially outer side of the previously proposed brush holder 52 (located on the rear end side of the brush 54) to figure out which part of the side wall 52c vibrates the most. FIG. 17A depicts the various points at which the vibrations are measured, and FIG. 17B depicts results of the measurements. During these measurements, the commutator 53 are rotated clockwise (direction of an arrow A) at the relatively low rotational speed of 15 [rpm]

which is the same rotational speed used in the above-described measurements.

As shown in FIG. 17A, in the side wall 52c, three measurement points are arranged at substantially equal intervals in a widthwise direction W (rotational direction), and four measurement points are arranged at substantially equal intervals in a heightwise direction H, so that vibrations are measured at a total of twelve measurement points P1–P12.

As shown in FIG. 17B, it has been found that the vibrations observed at the measurement points P1, P4, and P7 located at the upper left side (trailing side in the rotational direction) of the side wall 52c are particularly larger than the vibrations observed at the other measurement points P2, P3, P5, P6 and P8–P12 during the rotation of the commutator 53 at the low rotational speed. This is probably due to the following two reasons. First, a top portion of the side wall 52c, i.e., a top side 52d of the brush holder 52 is a free end, so that the top portion of the side wall 52c vibrates more easily in comparison to the other points. Secondly, during the rotation of the commutator 53 at the low rotational speed, the brush 54 tends to be displaced toward a side wall 52e located on the left side of the side wall 52c (trailing side in the rotational direction), i.e., a left side (trailing side in the rotational direction) of the brush holder 52 due to the rotation of the commutator 53, so that the brush 54 tends to hit the side wall 52e of the brush holder 52, causing generation of vibrations of the side wall 52e. Thus, the vibrations of the side wall 52e located on the left side (trailing side in the rotational direction) of the brush holder 52 are generally greater than vibrations of a side wall 52f located on the right side (leading side in the rotational direction).

On the other hand, in the brush holder 12 according to the present embodiment, the engaging piece 12d extends downwardly from the center of the top portion of the side wall 12c. Thus, the vibrations of a top side 12e that exhibits relatively large vibrations are effectively attenuated by the engaging piece 12d, reducing generation of the noises. Furthermore, since the engaging piece 12d is located at the center that is substantially equally spaced away from a left side wall 12f and a right side wall 12g, the vibrations of the brush holder 12 are substantially equally attenuated in both the clockwise rotation and the counterclockwise rotation of the commutator 4, resulting in reduction of noises in both the clockwise rotation and the counterclockwise rotation of the commutator 4.

As described above, in accordance with the present embodiment, the following advantages are achieved.

(1) In the present embodiment, the side wall 12c located at the radially outer side of the brush holder 12 (located on the rear end side of the brush 3) includes the engaging piece 12d that resiliently engages against the inner peripheral surface of the outer peripheral wall 11b of the circuit board 11. Thus, although the brush 3 exhibits self-excited vibrations during the rotation of the commutator 4, and the self-excited vibrations of the brush 3 are transmitted to the brush holder 12, resonance of the brush holder 12 is restrained due to the fact that the brush holder 12 resiliently engages against the circuit board 11 through the engaging piece 12d, resulting in reduced noise. That is, the generation of the noises can be reduced simply by modifying the shape of the brush holder 12. Thus, there is no need to change the material of the brush 3, and the number of the components is not increased.

(2) The engaging piece 12d extends downwardly from the center of the top portion of the side wall 12c. Thus, although the top portion of the side wall 12c (top portion of the brush holder 12) vibrates more easily due to the fact that the top portion of the side wall 12c is the free end, the provision of the engaging piece 12d in this region allows effective reduction of the vibrations of the brush holder 12.

(3) The engaging piece 12d is provided in the side wall 12c located at the radially outer side of the brush holder 12 (located on the rear end side of the brush 3). Thus, since the engaging piece 12d is positioned remote from the radially inner portion of the brush holder 12 where the brush 3 is held, it is not particularly required to consider a clearance of the brush 3.

(4) The engaging piece 12d is integrally formed in the brush holder 12. Thus, as the brush holder 12 is made of the metal material, it is easy to manufacture the engaging piece 12d that exerts the resilient force.

(5) The circuit board 11 that engages the engaging piece 12d is made of the resin material. Because of a difference in a Young's module between the engaging piece 12d and the circuit board 11, the vibrations of the brush holder 12 can be effectively restrained.

The embodiment of the present invention can be modified as follows.

In the brush holding device 1 of the above embodiment, the side wall 12c located at the radially outer side of the brush holder 12 (located on the rear end side of the brush 3) includes the engaging piece 12d that resiliently engages against the inner peripheral surface of the outer peripheral wall 11b of the circuit board 11. The present invention is not limited to this arrangement, and it is possible to modify the shape of the circuit board and the brush holder.

Figure 5:
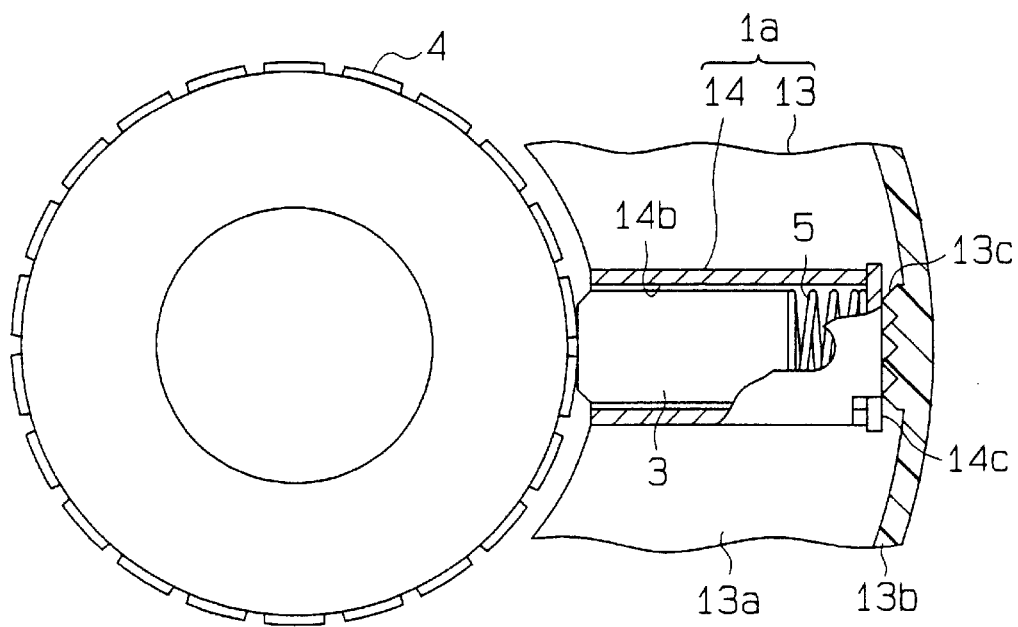
FIG. 5 is a partial plan cross-sectional view showing a modification of the brush holding device depicted in FIGS. 1 to 3.
Figure 6:
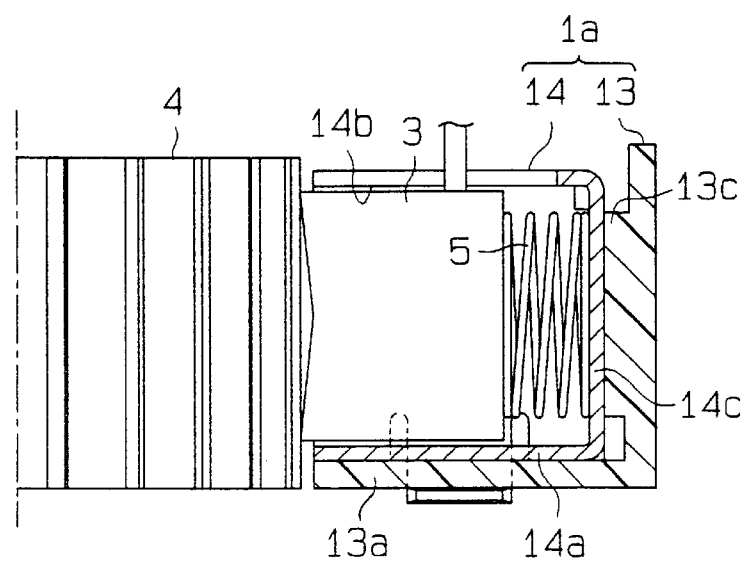
FIG. 6 is a partial side cross-sectional view showing the modification of the brush holding device depicted in FIG. 5.

For example, as shown in FIGS. 5 and 6, it is possible to provide a brush holding device 1a having a circuit board 13 made of the same material as the above circuit board and brush holders 14 (only one is shown) made of the same material as the above brush holders. More specifically, each brush holder 14 has the same shape as the previously proposed brush holder 52 and is secured to a flat portion 13a of the circuit board 13 at its base portion 14a. The brush holder 14 includes a receiving recess 14b for receiving the brush 3, and a side wall 14c located at a radially outer side of the brush holder 14 (located on the rear end side of the brush 3) is closed. Similar to the above circuit board, the circuit board 13 includes the flat portion 13a and an outer peripheral wall 13b. An engaging portion 13c is formed in a portion of the outer peripheral wall 13b that opposes the side wall 14c. The engaging portion 13c includes a plurality of engaging pieces that extend radially inwardly from the portion of the outer peripheral wall 13b. Each engaging piece of the engaging portion 13c has a decreasing width that decreases radially inwardly. The engaging portion 13c exerts the resilient force to resiliently engage against an opposed surface of the side wall 14c. The engaging portion 13c restrains the vibrations (resonance) of the brush holder 14. Thus, even with this arrangement, like the above embodiment, the noises can be restrained without changing the material of the brush and also without increasing the number of the components.

Figure 7:
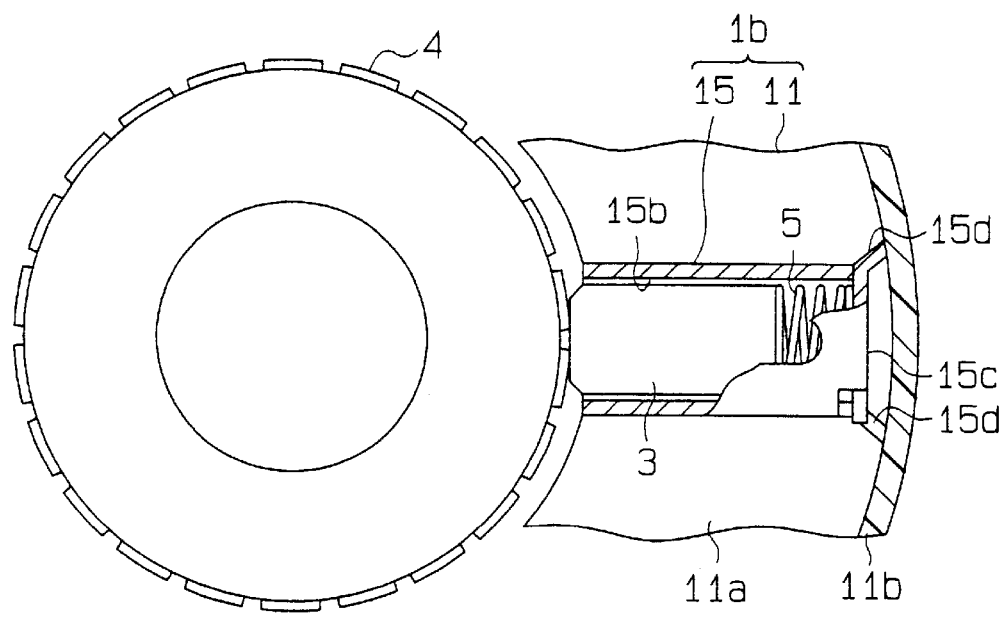
FIG. 7 is a partial plan cross-sectional view showing another modification of the brush holding device depicted in FIGS. 1 to 3.
Figure 8:
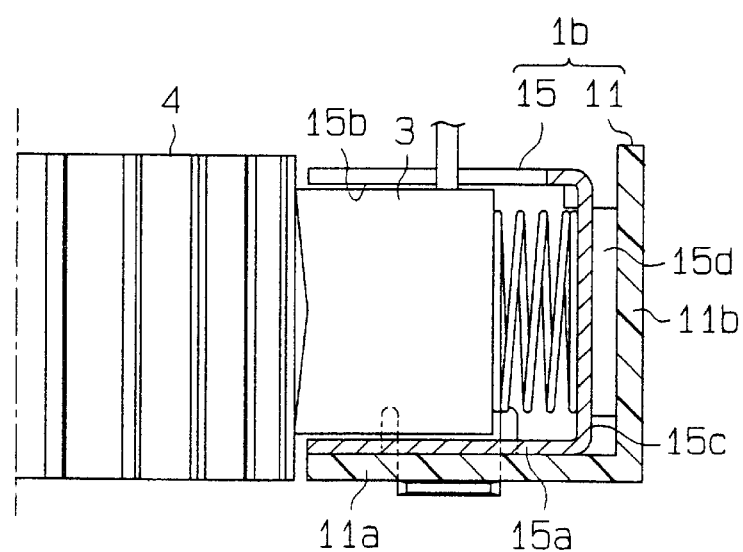
FIG. 8 is a partial side cross-sectional view showing the modification of the brush holding device depicted in FIG. 7.

With reference to FIGS. 7 and 8, it is possible to provide a brush holding device 1b having the above circuit board 11 and brush holders 15 (only one is shown). Each brush holder 15 is made of the same material as the above brush holder and is secured to the flat portion 1a of the circuit board 11 at its base portion 15a. The brush holder 15 has a receiving recess 15b for receiving the brush 3. A side wall 15c located at a radially outer side of the brush holder 15 (located on the rear end side of the brush 3) is closed. The side wall 15c has engaging pieces 15d. The engaging pieces 15d extend from left and right sides of the side wall 15c (i.e., from the opposed circumferential sides of the brush holder 15), respectively, and have a height substantially the same as the brush holder 15. Each engaging piece 15d exerts resilient force and resiliently engages against the inner peripheral surface of the outer peripheral wall 11b of the circuit board 11. The vibrations (resonance) of the brush holder 15 are restrained by the engaging pieces 15d. Thus, even with this arrangement, like the above embodiment, the noises can be restrained without changing the material of the brush and also without increasing the number of the components.

Figure 9:
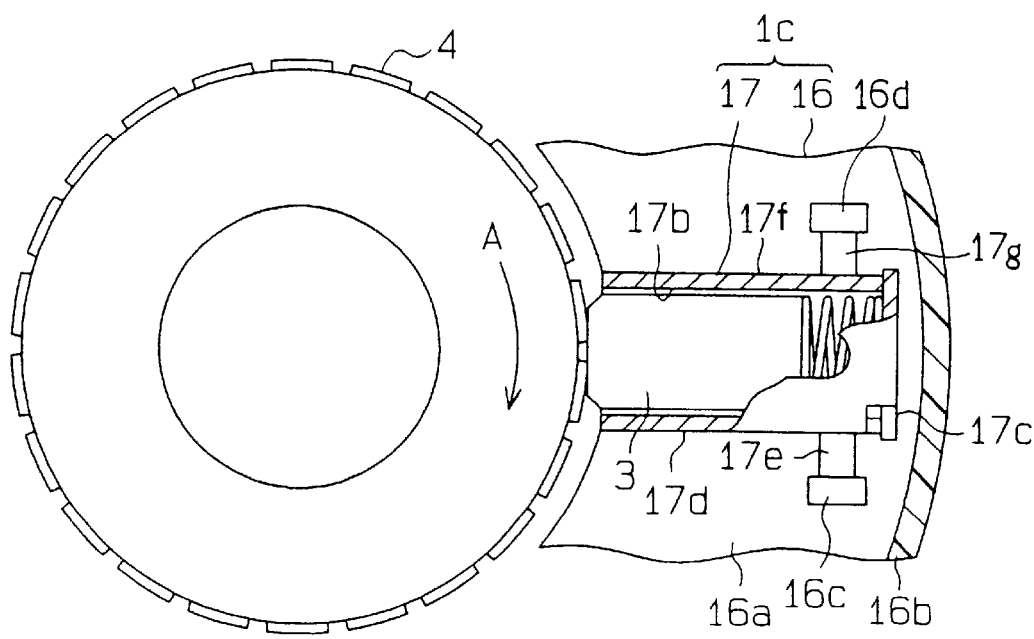
FIG. 9 is a partial plan cross-sectional view showing a further modification of the brush holding device depicted in FIGS. 1 to 3.
Figure 10:
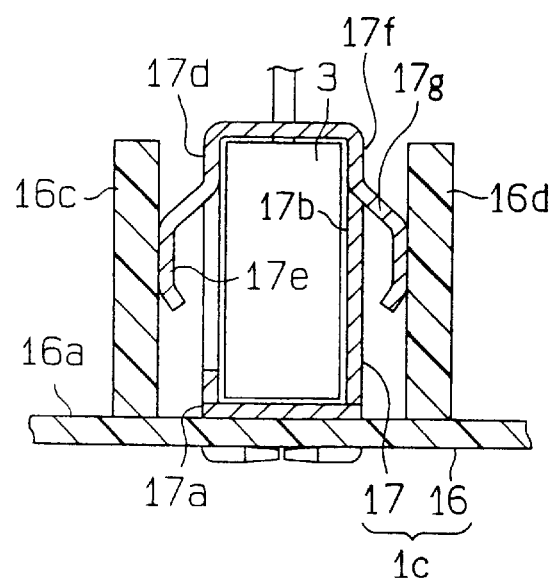
FIG. 10 is a partial cross-sectional view showing the modification of the brush holding device depicted in FIG. 10.

Furthermore, as shown in FIGS. 9 and 10, it is possible to provide a brush holding device 1c having a circuit board 16 made of the same material as the above circuit board and brush holders 17 (only one is shown) made of the same material as the above brush holders. Each brush holder 17 is secured to a flat portion 16a of the circuit board 16 at its base portion 17a. The brush holder 17 includes a receiving recess 17b for receiving the brush 3. A side wall 17c located at a radially outer side of the brush holder 17 (located on the rear end side of the brush 3) is closed. A rectangular engaging piece 17e is formed in a side wall (circumferential side wall) 17d that is located on the left side of the brush holder 17 (located on the rear end side of the brush 3) in FIG. 10. The engaging piece 17e is formed by cutting and bending a portion of the side wall 17d. The engaging piece 17e extends downwardly and outwardly of the holder 17 from a point near a top end of the side wall 17d and also near a radially outer side of the side wall 17d (located on the rear end side of the brush 3). The engaging piece 17e exerts resilient force. Also, another engaging piece 17g is formed in a side wall (circumferential side wall) 17f that is located in a right side of the brush holder 17 (located on the rear end side of the brush 3) in FIG. 10. The engaging piece 17g is formed by cutting and bending a portion of the side wall 17f. The engaging piece 17g extends downwardly and outwardly of the holder 17 from a point near a top end of the side wall 17f and also near a radially outer side of the side wall 17f (located on the rear end side of the brush 3). The engaging piece 17g exerts resilient force. Similar to the above circuit board, the circuit board 16 includes the flat portion 16a and an outer peripheral wall 16b. The flat portion 16a has two erected pieces 16c, 16d. In a radially outer portion of the circuit board 16, the erected pieces 16c, 16d are arranged adjacent to the engaging pieces 17e, 17g and circumferentially oppose the engaging pieces 17e, 17g, respectively. The erected pieces 16c, 16d are integrally formed with the flat portion 16a and extend away from the flat portion 16a. Each engaging piece 17e, 17g resiliently engages against the corresponding erected piece 16c, 16d and restrains the vibrations (resonance) of the brush holder 17.

When the commutator 4 rotates clockwise (direction of an arrow A) in FIG. 9, the large vibrations are observed at the upper left side (trailing side in the rotational direction) of the brush holder 17, as shown in FIGS. 17A and 17B. Because of the provision of the engaging piece 17e at this region, the vibrations of the brush holder 17 can be effectively restrained during the rotation of the commutator 4 in the clockwise direction. Similarly, when the commutator 4 rotates counterclockwise (direction opposite to the direction of the arrow A) in FIG. 9, the large vibrations are observed at the upper right side (trailing side in the rotational direction) of the brush holder 17. Because of the provision of the engaging piece 17g at this region, the vibrations of the brush holder 17 can be effectively restrained during the rotation of the commutator 4 in the counterclockwise direction. As a result, even with this arrangement, like the above embodiment, the noises can be restrained without changing the material of the brush and also without increasing the number of the components.

Figure 11:
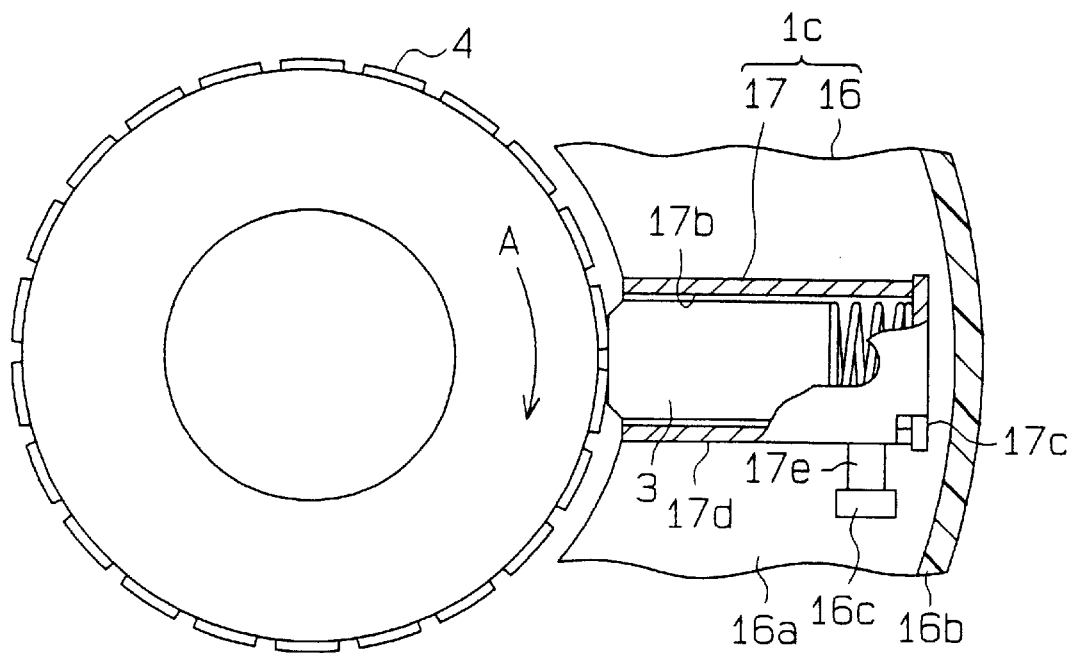
FIG. 11 is a partial plan cross-sectional view showing a further modification of the brush holding device depicted in FIGS. 1 to 3.
Figure 12:
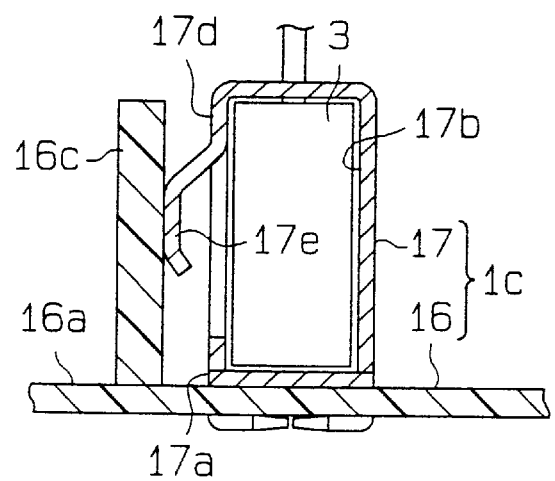
FIG. 12 is a partial cross-sectional view showing the modification of the brush holding device depicted in FIG. 11.
Figure 13:
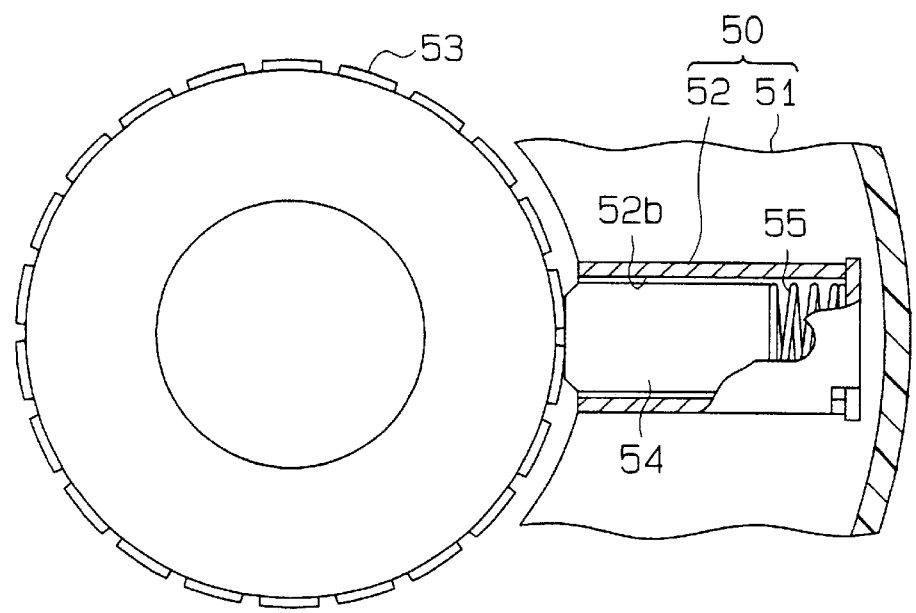
FIG. 13 is a partial plan cross-sectional view showing a previously proposed brush holding device.
Figure 14:
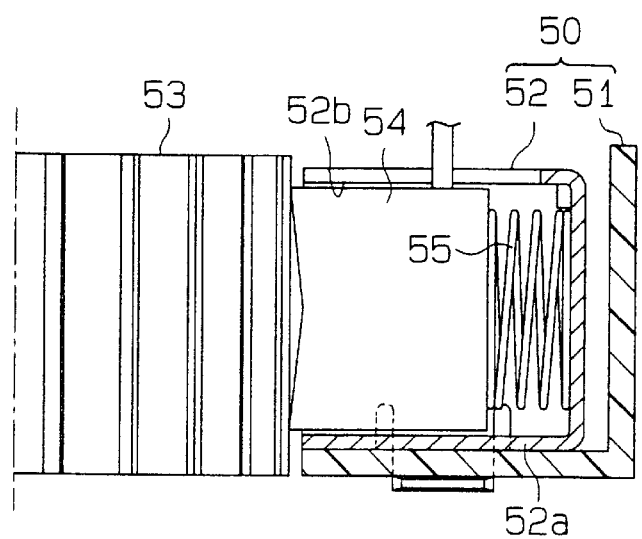
FIG. 14 is a partial side cross-sectional view of the previously proposed brush holding device.
Figure 15:
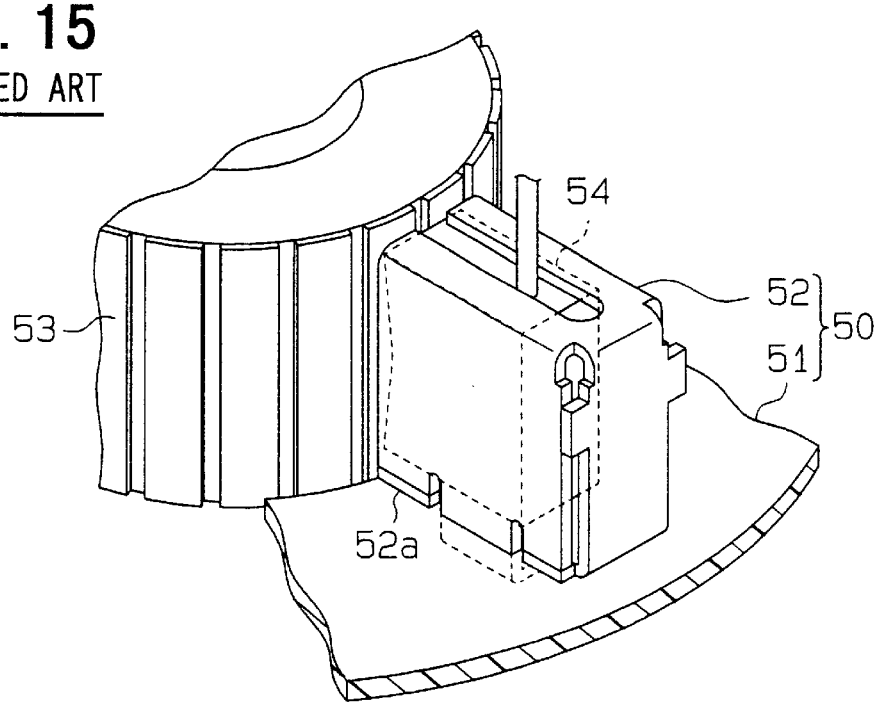
FIG. 15 is a partial perspective view of the previously proposed brush holding device.

Also, the brush holding device 1c can be modified as shown in FIGS. 11 and 12. In the brush holding device 1c shown in FIGS. 11 and 12, the brush holder 17 includes only the engaging piece 17e and does not have the engaging piece 17g. Furthermore, the flat portion 16a of the circuit board 16 includes only the erected piece 16c and does not have the erected piece 16d. This brush holding device 1c is used for a motor that has the commutator 4 rotating only in the clockwise direction (the direction of the arrow A). When the commutator 4 rotates clockwise (direction of the arrow A), the large vibrations are observed at the upper left side (trailing side in the rotational direction) of the brush holder 17, as described above. Because of the provision of the engaging piece 17e at this region, the vibrations of the brush holder 17 can be effectively restrained during the rotation of the commutator 4 in the clockwise direction.

Furthermore, in the above embodiment, the engaging piece 12d depicted in FIGS. 1 to 3 engages against the circuit board 11. However, the engaging piece 12d can be modified to engage against the housing 2. In such a case, for example, the outer peripheral wall 11b of the circuit board 11 may be removed, and a portion of the housing 2 that extends in the same direction as the outer peripheral wall 11b may be placed at the location of the outer peripheral wall 11b. Also, in the various modifications described above, the outer peripheral wall 11b, 13b of the circuit board 11, 13 may be removed, and a portion of the housing 2 that extends in the same direction as the outer peripheral wall 11b, 13b may be placed at the location of the outer peripheral wall 11b, 13b. In addition, in place of the engaging piece(s) 12d, 15d or the engaging portion 13c, a corresponding engaging portion(s) can be formed in the housing 2.

Also, any combination of the above arrangements is possible.

The brush holder of the above embodiment can be made of any suitable metal material other than the brass material.

A shape of the spring 5 can be modified to any other appropriate shape.

Additional advantages and modifications will readily occur to those skilled in the art. The invention in its broader terms is therefore, not limited to the specific details, representative apparatus, and illustrative examples shown and described.

What is claimed is:

1. A brush holding device comprising a dielectric resin circuit board and at least one metal brush holder secured to said circuit board at its base portion, said circuit board being secured to a motor housing, each said brush holder including a receiving recess that receives a brush and a spring for urging said brush against a commutator, wherein one of said each brush holder and said circuit board or said housing has at least one engaging portion integrally formed therein for achieving resilient engagement between said each brush holder and said circuit board or said housing.

2. A brush holding device according to claim 1, wherein said at least one engaging portion achieves said resilient engagement between a predetermined part of a top portion of said each brush holder and said circuit board or said housing.

3. A brush holding device according to claim 1, wherein said at least one engaging portion achieves said resilient engagement between a predetermined part of a radially outer portion of said each brush holder and said circuit board or said housing.

4. A brush holding device according to claim 2, wherein said at least one engaging portion achieves said resilient engagement between a predetermined part of a radially outer portion of said each brush holder and said circuit board or said housing.

5. A brush holding device according to claim 1, wherein said at least one engaging portion achieves said resilient engagement between said circuit board or said housing and at least one of opposed circumferential sides of said each brush holder.

6. A brush holding device according to claim 1, wherein said at least one engaging portion achieves said resilient engagement between a predetermined part of said each brush holder, which is located at a trailing side thereof in a rotational direction of said commutator, and said circuit board or said housing.

7. A brush holding device according to claim 1, wherein said at least one engaging portion includes at least one engaging piece that is integrally formed in said each brush holder and exerts resilient force, said at least one engaging piece resiliently engaging against said circuit board.

8. A brush holding device according to claim 1, wherein said at least one engaging portion includes at least one engaging piece that extends from a top portion of said each brush holder and resiliently engages against a corresponding radially outer portion of said circuit board or a corresponding radially outer portion of said housing.

9. A brush holding device according to claim 1, wherein said at least one engaging portion includes a plurality of engaging pieces that extend radially inwardly from a portion of said circuit board or a portion of said housing located radially outward of said each brush holder toward a radially outer side of said each brush holder to resiliently engage against said radially outer side of said each brush holder, each one of said plurality of engaging pieces having a decreasing width that decreases radially inwardly.

10. A brush holding device according to claim 1, wherein said at least one engaging portion includes two engaging pieces that extend radially outwardly from opposed circumferential sides of said each brush holder and that resiliently engage against a portion of said circuit board or a portion of said housing located radially outward of said each brush holder, each one of said two engaging pieces having a height substantially the same as that of said each brush holder.

11. A brush holding device according to claim 1, wherein said at least one engaging portion includes two engaging pieces that extend circumferentially outwardly away from top portions of opposed circumferential sides of said each brush holder, respectively, and that resiliently engage against radially outer portions of said circuit board or radially outer portions of said housing, respectively.

12. A brush holding device according to claim 1, wherein said at least one engaging portion includes two engaging pieces that extend circumferentially outwardly away from top portions of opposed circumferential sides of said each brush holder, respectively, and that resiliently engage against portions of said circuit board or portions of said housing, respectively, said portions of said circuit board or said portions of said housing being located adjacent to said opposed circumferential sides of said each brush holder, respectively.

13. A brush holding device comprising a dielectric resin circuit board and at least one metal brush holder secured to said circuit board at its base portion, said circuit board being secured to a motor housing, each said brush holder including a receiving recess that receives a brush and a spring for urging said brush against a commutator, wherein:
   one of said each brush holder and said circuit board or said housing has at least one engaging portion integrally formed therein for achieving resilient engagement between said each brush holder and said circuit board or said housing;
   said at least one engaging portion includes at least one engaging piece that is integrally formed in a rear end wall of said each brush holder and exerts resilient force, wherein the rear end wall of said each brush holder is located at a radially outer side of said each brush holder and is engaged with the spring, and said at least one engaging piece resiliently engages against said circuit board.

14. A brush holding device comprising a dielectric resin circuit board and at least one metal brush holder secured to said circuit board at its base portion, said circuit board being secured to a motor housing, each said brush holder including a receiving recess that receives a brush and a spring for urging said brush against a commutator, wherein:
   one of said each brush holder and said circuit board or said housing has at least one engaging portion integrally formed therein for achieving resilient engagement between said each brush holder and said circuit board or said housing; and
   said at least one engaging portion includes at least one engaging piece that extends from a top portion of a rear end wall of said each brush holder and resiliently engages against a corresponding radially outer portion of said circuit board or a corresponding radially outer portion of said housing, wherein the rear end wall of said each brush holder is located at a radially outer side of said each brush holder and is engaged with the spring.

15. An electric motor brush holder, comprising:
   a casing including a receiving recess for receiving a brush and for receiving a spring for pressing the brush against a commutator; and
   at least one engaging portion integrally formed with the casing for achieving resilient engagement between the brush holder and one of a circuit board and a housing.

16. The electric motor brush holder of claim 15, wherein the engaging portion achieves resilient engagement between a top portion of the brush holder and one of the circuit board and the housing.

17. The electric motor brush holder of claim 16, wherein the engaging portion achieves resilient engagement between a radially outer portion of the brush holder and one of the circuit board and the housing.

18. The electric motor brush holder of claim 15, wherein the engaging portion achieves resilient engagement between a radially outer portion of the brush holder and one of the circuit board and the housing.

19. The electric motor brush holder of claim 15, wherein the engaging portion achieves resilient engagement between one of the circuit board and the housing and at least one of the opposing circumferential sides of the brush holder.

20. The electric motor brush holder of claim 15, wherein the engaging portion achieves resilient engagement between a portion of the brush holder located at a trailing side thereof in a rotational direction of the commutator and one of the circuit board and the housing.

21. The electric motor brush holder of claim 15, wherein the engaging portion further comprises at least one engaging piece that is integrally formed in the brush holder, that exerts resilient force and that resiliently engages the circuit board.

22. The electric motor brush holder of claim 15, wherein the engaging portion further comprises at least one engaging piece that extends from a top portion of the brush holder and resiliently engages a corresponding radially outward portion of one of the circuit board and the housing.

23. The electric motor brush holder of claim 15, wherein the engaging portion further comprises a plurality of engaging pieces that extend radially inwardly from a portion of one of the circuit board and the housing located radially outwardly from the brush holder, the plurality of engaging pieces each having a decreasing width that decreases radially inwardly.

24. The electric motor brush holder of claim 15, wherein the engaging portion includes two engaging pieces that extend radially outwardly from opposing circumferential sides of the brush holder and resiliently engage a portion of one of the circuit board and the housing located radially outwardly from the brush holder, the engaging pieces each having a height substantially the same as that of the brush holder.

25. The electric motor brush holder of claim 15, wherein the engaging portion includes two engaging pieces that extend circumferentially outwardly away from top portions of opposing circumferential sides of the brush holder, respectively, and that resiliently engage radially outer portions of one of the circuit board or the housing.

26. The electric motor brush holder of claim 15, wherein the engaging portion includes two engaging pieces that extend circumferentially outwardly away from top portions of opposing circumferential sides of the brush holder, respectively, and that resiliently engage portions of one of the circuit board and housing, said portions of one of the circuit board and housing being located adjacent to the opposing circumferential sides of the brush holder, respectively.

* * * * *